(12) United States Patent
Aram et al.

(10) Patent No.: US 7,880,989 B1
(45) Date of Patent: *Feb. 1, 2011

(54) WRITE DRIVER CIRCUIT FOR MAGNETIC DATA STORAGE SYSTEMS

(75) Inventors: Farbod Aram, Cupertino, CA (US); Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 208 days.

This patent is subject to a terminal disclaimer.

(21) Appl. No.: 12/229,393

(22) Filed: Aug. 22, 2008

Related U.S. Application Data (63) Continuation of application No. 10/392,242, filed on Mar. 18, 2003, now Pat. No. 7,417,817.

(51) Int. Cl.
*G11B 5/09* (2006.01)
(52) U.S. Cl. .............................. 360/46; 360/65; 360/67; 360/68
(58) Field of Classification Search ................... 360/46, 360/61–62, 65, 67–68
See application file for complete search history.

(56) References Cited

U.S. PATENT DOCUMENTS

| | | | |
|---|---|---|---|
| 4,551,772 A | 11/1985 | Sliger | |
| 5,291,069 A * | 3/1994 | Gooding et al. | ............. 327/482 |
| 5,331,479 A | 7/1994 | Madsen | |
| 5,386,328 A | 1/1995 | Chiou et al. | |
| 5,612,828 A | 3/1997 | Brannon et al. | |
| 5,638,012 A * | 6/1997 | Hashimoto et al. | .......... 327/110 |
| 5,757,215 A | 5/1998 | Schuelke et al. | |
| 5,781,046 A | 7/1998 | Ngo et al. | |
| 5,822,141 A | 10/1998 | Chung et al. | |
| 5,869,988 A | 2/1999 | Jusuf et al. | |
| 5,894,237 A | 4/1999 | Brannon et al. | |
| 6,052,017 A | 4/2000 | Pidutti et al. | |
| 6,181,496 B1 | 1/2001 | Price, Jr. | |
| 6,184,727 B1 | 2/2001 | Price, Jr. | |
| 6,185,057 B1 | 2/2001 | Masenas | |
| 6,191,643 B1 | 2/2001 | Nayebi et al. | |
| 6,201,653 B1 | 3/2001 | Contreras et al. | |
| 6,218,903 B1 | 4/2001 | Hashimoto et al. | |
| 6,222,695 B1 | 4/2001 | Canario | |
| 6,246,269 B1 | 6/2001 | Schuler et al. | |
| 6,246,533 B1 | 6/2001 | Davis et al. | |
| 6,252,450 B1 | 6/2001 | Patti et al. | |
| 6,259,305 B1 | 7/2001 | Pakriswamy | |
| 6,285,221 B1 * | 9/2001 | Leighton et al. | ............. 327/110 |
| 6,297,921 B1 * | 10/2001 | Price et al. | ..................... 360/68 |
| 6,335,643 B1 | 1/2002 | Ono | |
| 6,366,421 B2 | 4/2002 | Teterud | |
| 6,373,298 B1 * | 4/2002 | Teterud et al. | ............... 327/110 |
| 6,396,346 B1 | 5/2002 | Ranmuthu et al. | |
| 6,404,574 B1 | 6/2002 | Barnett | |

(Continued)

*Primary Examiner*—Dismery E Mercedes (57) ABSTRACT

A write driver circuit includes a first write driver that communicates with a first node of a write head. A first feedback path communicates with a control input and an output of the first write driver. The first feedback path includes a first resistance connected between the output of the first write driver and the control input of the first write driver. A second write driver communicates with a second node of the write head. A second feedback path communicates with a control input and an output of the second write driver. The second feedback path includes a second resistance connected between the output of the second write driver and the control input of the second write driver.

20 Claims, 13 Drawing Sheets

U.S. PATENT DOCUMENTS

| | | | |
|---|---|---|---|
| 6,429,987 B1 | 8/2002 | Cheng | |
| 6,456,148 B2 | 9/2002 | Patti et al. | |
| 6,504,666 B1 | 1/2003 | Patti et al. | |
| 6,512,645 B1 * | 1/2003 | Patti et al. | 360/46 |
| 6,512,646 B1 | 1/2003 | Leighton et al. | |
| 6,532,123 B1 * | 3/2003 | Veenstra et al. | 360/46 |
| 6,545,514 B2 * | 4/2003 | Barrow | 327/110 |
| 6,587,296 B1 | 7/2003 | Iroaga et al. | |
| 6,603,623 B1 | 8/2003 | Fontana et al. | |
| 6,721,115 B2 | 4/2004 | Price, Jr. | |
| 6,798,591 B2 | 9/2004 | Barnett et al. | |
| 6,798,598 B2 | 9/2004 | Suzuki et al. | |
| 6,813,110 B2 | 11/2004 | Leighton et al. | |
| 6,831,800 B2 * | 12/2004 | Ranmuthu | 360/68 |
| 6,879,455 B2 | 4/2005 | Ngo et al. | |
| 6,927,933 B2 * | 8/2005 | Choi et al. | 360/68 |
| 7,006,313 B2 * | 2/2006 | Ngo | 360/46 |
| 7,110,198 B1 * | 9/2006 | Aram et al. | 360/46 |
| 7,206,155 B2 | 4/2007 | Kuehlwein et al. | |
| 7,277,245 B1 | 10/2007 | Aram et al. | |
| 7,280,300 B1 | 10/2007 | Aram et al. | |
| 7,417,817 B1 * | 8/2008 | Aram et al. | 360/68 |
| 2002/0186578 A1 | 12/2002 | Kim | |
| 2003/0184901 A1 | 10/2003 | Takahashi | |
| 2005/0190476 A1 | 9/2005 | Wilson et al. | |
| 2006/0097761 A1 | 5/2006 | Stein et al. | |

\* cited by examiner

WRITE DRIVER CIRCUIT FOR MAGNETIC DATA STORAGE SYSTEMS

CROSS-REFERENCE TO RELATED APPLICATIONS

This application is a continuation of U.S. patent application Ser. No. 10/392,242 filed on Mar. 18, 2003 (now U.S. Pat. No. 7,417,817, issued Aug. 26, 2008). The disclosure of the above application is incorporated herein by reference.

FIELD OF THE INVENTION

The present invention relates to magnetic data storage systems, and more particularly to a write driver circuit for a write head in a magnetic data storage system operating at high data transfer rates.

BACKGROUND OF THE INVENTION

Conventional data storage systems typically write information onto a recording surface of a magnetic storage medium. These systems typically include a write head and a write driver circuit. The magnetic storage medium may be a disk drive of a computer. The write head may be an inductive coil, although other types of write heads may be used.

Information is written to the magnetic storage medium by switching a direction of current flowing through the write head. A magnetic field that is produced by the write head is stored by the magnetic storage medium. One polarity represents one digital value and the opposite polarity represents the other digital value. Data storage rates of these systems are proportional to a rate that the write driver circuit can change the direction of the write current through the write head.

SUMMARY OF THE INVENTION

A write driver circuit for a magnetic storage medium that communicates with a write head having first and second nodes comprises a first driver circuit having a first input, a first output that communicates with the first node, and a first feedback path between the first input and the first output. A second driver circuit has a second input, a second output that communicates with the second node, and a second feedback path between the second input and the second output. A first write current circuit selectively drives current through the write head in a first direction. A second write current circuit selectively drives current through the write head in a second direction. A first boost circuit decreases a first transition period between current flowing in the first direction and current flowing in the second direction.

In other features, a second boost circuit decreases a second transition period between current flowing in the second direction and current flowing in the first direction. The first write current circuit includes a first write current source that communicates with the opposite end of the first resistance and a second write current source that communicates with the second node of the write head. The second write current circuit includes a third write current source that communicates with the opposite end of the second resistance and a fourth write current source that communicates with the first node of the write head.

In other features, the first feedback path includes a first resistance having one end that communicates with the output of the first driver circuit. A first transistor has a base that is connected to an opposite end of the first resistance and a collector that is connected to the input of the first driver circuit. The second feedback path includes a second resistance having one end that communicates with the output of the second driver circuit. A second transistor has a base that is connected to an opposite end of the second resistance and a collector that is connected to the input of the second driver circuit. A first common mode (CM) current source communicates with the opposite end of the second resistance. A second common mode (CM) current source communicates with the opposite end of the first resistance.

In other features, the first boost circuit includes a first switch that shorts the base of the first transistor and that turns off the first common mode current source during a first boost period. The second boost circuit includes a second switch that shorts the base of the second transistor and that turns off the second common mode current source during a second boost period. A third resistance has one end that communicates with the output of the first driver circuit and an opposite end that communicates with the first node of the write head. A fourth resistance has one end that communicates with the output of the second driver circuit and an opposite end that communicates with the second node of the write head.

In still other features, the write driver circuit has a substantially constant output impedance during operation. The write driver circuit has balanced differential and common mode resistance. The write driver circuit maintains a substantially constant common mode voltage across the write head during operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

Figures 1A, 1B:
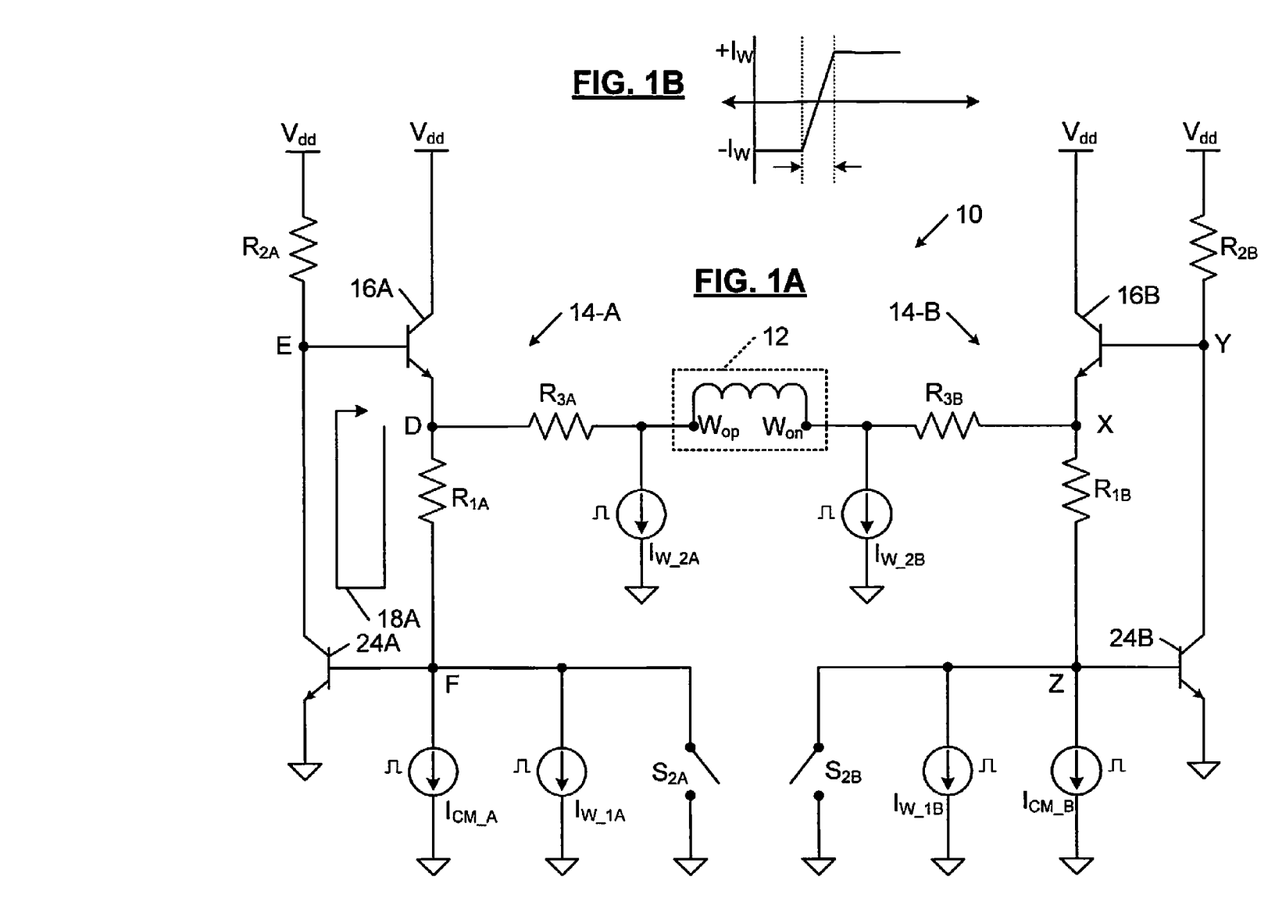
FIG. 1A is a schematic diagram of a write driver circuit according to the present invention.
FIG. 1B is a graph showing an exemplary write current waveform.

Referring now to FIGS. 1A and 1B, an exemplary write driver circuit 10 in accordance with the present invention is shown. The write driver circuit 10 switches a direction of write current $I_W$ (shown in FIG. 1B) flowing through a write head 12 of a magnetic storage device. While the following description describes the write head 12 implemented in the magnetic storage device, the write driver circuit 10 according to the present invention may be useful in other applications.

The write driver circuit 10 according to the present invention achieves several operating requirements. The write driver circuit 10 has substantially constant output impedance at very high operating frequencies. The write head 12 sees an impedance that is predominantly resistive during operation. Second, the write driver circuit 10 balances both differential and common mode resistance. Third, the write driver circuit 10 maintains a common mode voltage level across the write head 12 with minimal fluctuation during operation. The common and differential resistance is also independent of the magnitude of the write current.

Referring to FIGS. 1A and 1B, the write driver circuit 10 is a translinear circuit with symmetric sub-circuits 14-A and 14-B (collectively identified as 14) that are connected to opposite sides of the write head 12. For purposes of illustration, the left side of the symmetric write driver circuit 10 is described further below. Since the sub-circuits 14A and 14B are symmetric, the same reference numbers and/or other identification will be used followed by A to identify components in sub-circuit 14A and B to identify components of sub-circuit 14B.

The sub-circuit 14A includes a transistor 16A operating as a driver circuit. A collector of the transistor 16A is coupled to a voltage source $V_{dd}$. An emitter of the transistor 16A communicates with one side of the write head 12. In particular, the emitter of the transistor 16A is coupled to node D, which is coupled through a resistance $R_{3A}$ to head node $W_{op}$ of the write head 12.

The voltage source $V_{dd}$ is connected via a resistance $R_{2A}$ to a base of the transistor 16A. The base of the transistor 16A is designated as node E. As will be further described below, a feedback path 18A is provided between the emitter of the transistor 16A and the base of the transistor 16A. The feedback path includes a resistance $R_{1A}$ and a transistor 24A. The emitter of the transistor 16A is connected to one end of the resistance $R_{1A}$. An opposite end of the resistance $R_{1A}$ is connected to a base of the transistor 24A (designate node F). A collector of the transistor 24A is connected to a one end of a resistance $R_{2A}$ and to the base of the transistor 16A.

A write current source $I_{W\_1A}$, a common mode current source $I_{CM\_A}$ and a switch $S_{2A}$ are connected in parallel between node F and ground. The node F is coupled via the resistance $R_{1A}$ to node D. An additional write current source $I_{W\_2A}$ is coupled between the write head node $W_{op}$ of the write head 12 and ground. A symmetric circuit 14B is coupled to the right side of the write head 12 and elements are labeled with subscript "_B". Note that nodes D, E and F of the sub-circuit 14-A correspond to nodes X, Y, and Z in the sub-circuit 14-B. The current sources may be implemented using a current mirror arrangement as is well known in the art.

As can be appreciated, by switching the write current sources $I_{W\_1A}$ and $I_{W\_2B}$ off and the write current sources $I_{W\_2A}$ and $I_{W\_1B}$ on, current flows through the write head 12 from left to right in FIG. 1. To increase the reversal speed of the write current, a boost circuit selectively closes switches $S_{2A}$ and $S_{2B}$ (shown in FIG. 1) as will be described below. The boost circuit also switches the common mode current sources $I_{CM\_A}$ and $I_{CM\_B}$ off temporarily during transitions.

Figure 2:
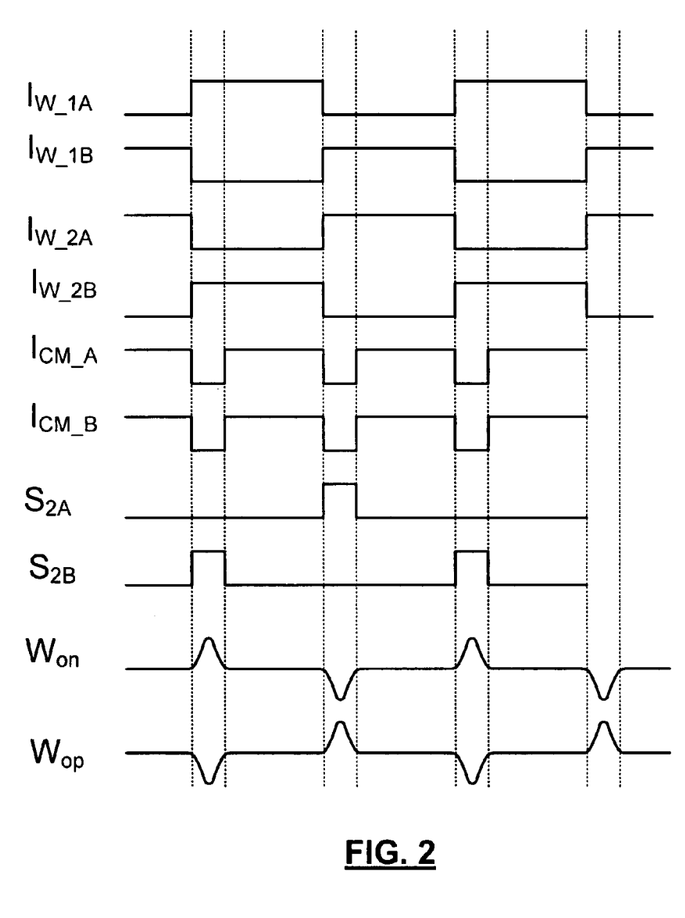
FIG. 2 illustrates various waveforms associated with common mode current sources, write current sources and switches of FIG. 1A according to the present invention.

Referring now to FIGS. 1A and 2, exemplary waveforms depicting the operation of the controlled current sources $I_{W\_1A}$, $I_{W\_2A}$, $I_{W\_1B}$, $I_{CM\_A}$ and $I_{CM\_B}$ and the switches $S_{2A}$ and $S_{2B}$ are shown. To obtain current flow from $W_{op}$ to $W_{on}$, the write current sources $I_{W\_1A}$ and $I_{W\_2B}$ are turned on and the write current sources $I_{W\_2A}$ and $I_{W\_1B}$ are turned off. During an initial boost period, the common mode current sources $I_{CM\_A}$ and $I_{CM\_B}$ are turned off and the switch $S_{2A}$ is turned on. The boost circuit reduces the voltage at node X and increases the voltage at node D quickly and symmetrically. The improved transition speed allows increased data rates while the symmetric transition maintains a relatively constant common mode voltage. To bring the voltage at node X down, the common mode current sources are turned off, which decreases the voltage at node X. To increase the voltage at node D, the transistor 24A is turned off by the switch $S_{2A}$, which forces $V_{be}$ of the transistor 16A to increase. Current flows from $W_{op}$ to $W_{on}$.

To obtain current flow from $W_{on}$ to $W_{op}$, the write current sources $I_{W\_2A}$ and $I_{W\_1B}$ are tuned on and the write current sources $I_{W\_1A}$ and $I_{W\_2B}$ are turned off. During a boost period, the current sources $I_{CM\_A}$ and $I_{CM\_B}$ are turned off and the switch $S_{2B}$ is turned on. The boost circuit reduces the voltage at node D and increases the voltage at node X both quickly and symmetrically. To bring the voltage at node D down, the common mode current sources $I_{CM}$ are turned off, which decreases the voltage at node D. To increase the voltage at node X, the transistor 24B is turned off, which forces $V_{be}$ of the transistor 16B to increase. Current flows from $W_{on}$ to $W_{op}$.

Figure 3:
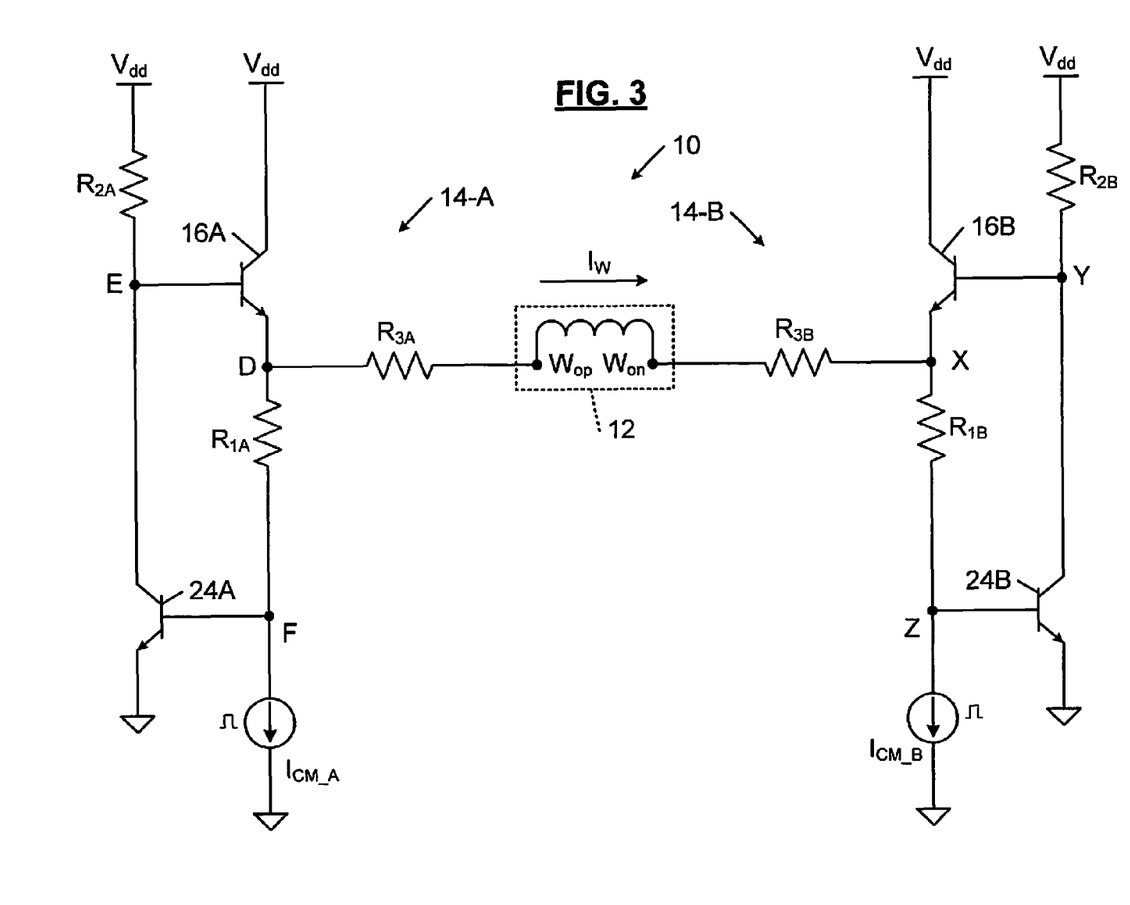
FIG. 3 is a partial schematic diagram illustrating the operation of the write driver circuit of FIG. 1A without the write current sources.

Referring now to FIG. 3, operation of the circuit will be described in more detail without the write current sources $I_{W\_1A}$, $I_{W\_2A}$, $I_{W\_1B}$, and $I_{W\_2B}$ and the switches $S_{2A}$ and $S_{2B}$. Based on Kirchoff's voltage law:

$$V_{be\_24A} + V_{DF} + V_{D,W_{op}} = V_{be\_24B} + V_{XZ} + V_{X,W_{on}}$$

If $R_{1A} = R_{1B} = R_{3A} = R_{3B}$, $I_{CM\_A} = I_{CM\_B}$, and $$V_{be_{24A}} = V_{be\_24B},$$

Then $V_{DF} = I_{CM\_A} R_{1A} = V_{XZ} = I_{CM\_B} R_{1B}$, and $V_{XZ}=I_{CM\_B}R_{1B}.$ In addition, $V_{W_{op}}=V_{W_{on}}$ and $I_W=0$.

Therefore, the voltage at the write head is zero and the write current is zero.

Figure 4:
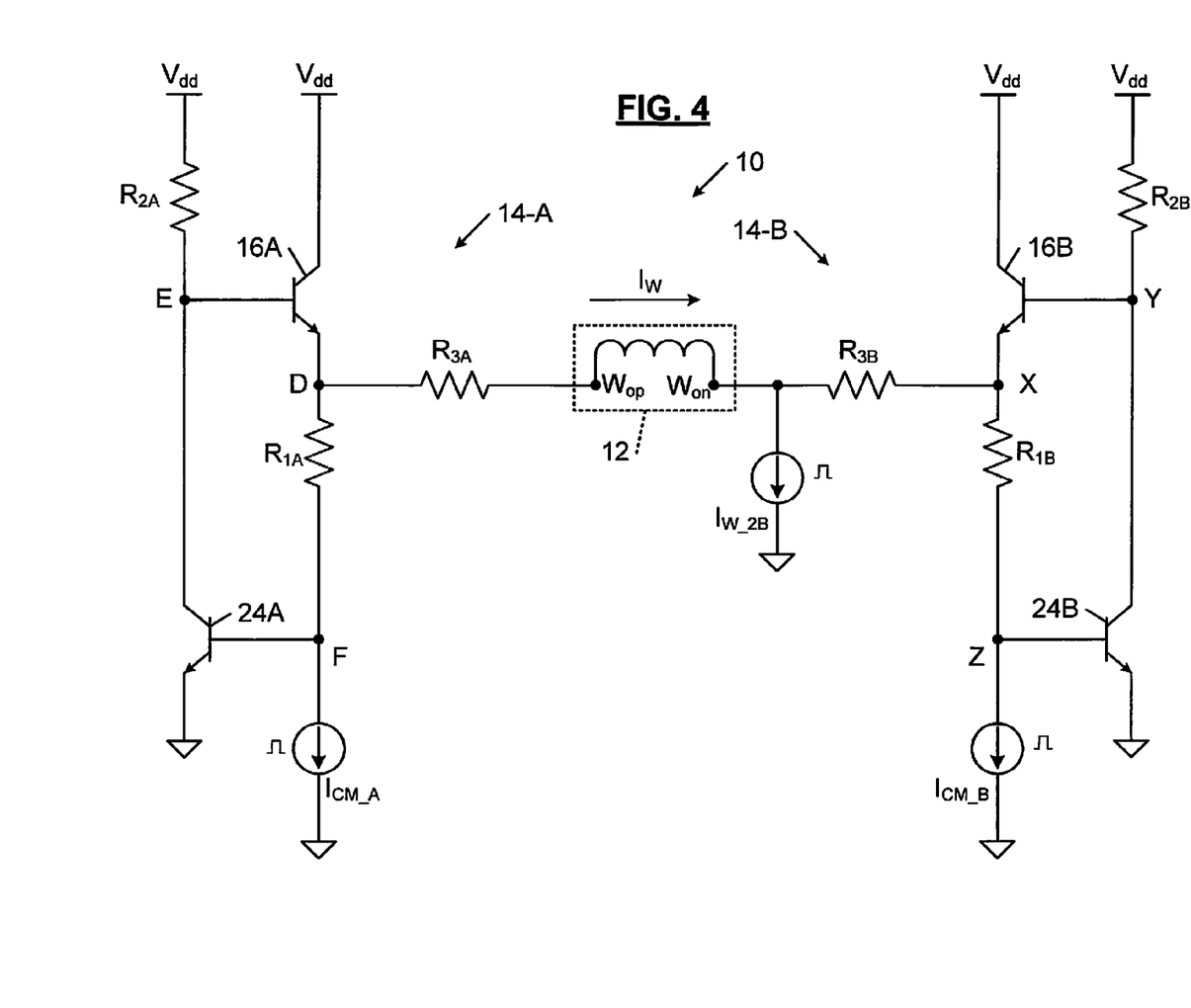
FIG. 4 is a partial schematic diagram illustrating the operation of the write driver circuit of FIG. 1A with one write current source connected to one node of a write head.

Referring now to FIG. 4, introducing the write current source $I_{W\_2B}$ into the write circuit of FIG. 3 will force $I_{W\_2B}/2$ across $R_{3A}$ and $R_{3B}$. In other words, the write current 6 is equal to $I_{W\_2B}/2$ and the voltage at nodes of the write head is:

$V_{W_{op}}=V_{W_{on}}=R_{3A}I_{W\_2B}/2.$

Therefore, the write current causes an imbalance, which increases the voltage at the write head and increases the write current.

Figure 5:
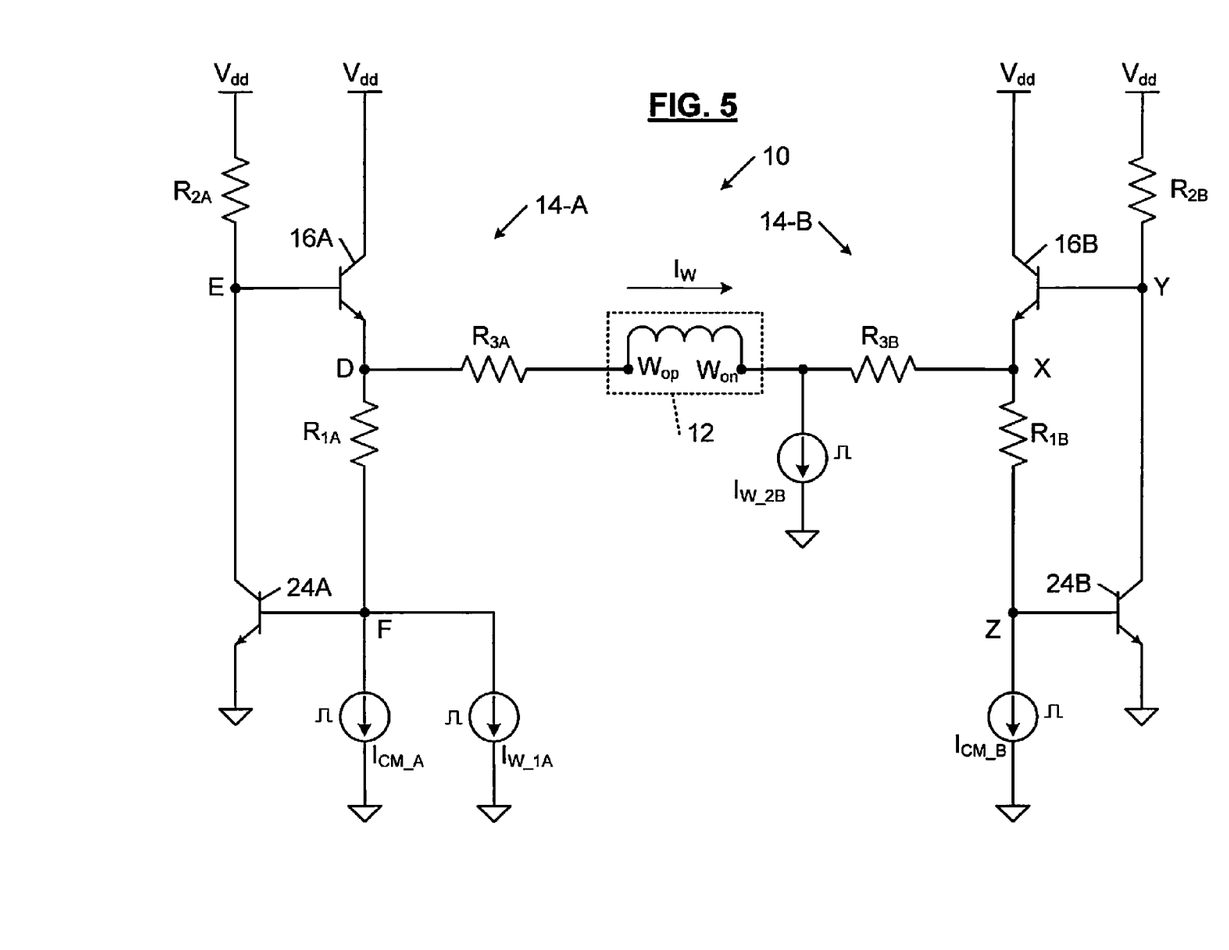
FIG. 5 is a partial schematic diagram that is similar to FIG. 4 with an additional write current source connected to a base of a feedback transistor.

Referring now to FIG. 5, introducing the write current source $I_{W\_2A}$ further increases the write current from $I_{W\_2B}/2$ to $I_{W\_2B}$. More particularly, substituting:

$V_{DF}=I_{CM\_A}R_{1A}+I_{W\_1A}R_{1A};$ and $V_{XY}=I_{CM\_B}R_{1B}$ into Kirchoff's voltage equation yields:

$V_{be\_24A}+(I_{CM\_A}R_{1A}+I_{W\_1A}R_{1A})+V_{D,W_{op}}=V_{be\_24B}+I_{CM\_B}R_{1B}+V_{X,W_{on}}$

If $R_{1A}=R_{1B}=R_{3A}=R_{3B},$ $V_{be\_24A}=V_{be\_24B},$ and $I_{CM\_A}=I_{CM\_B}.$ Then, $V_{D,W_{op}}=I_{W1A}R_{3A}$ or, $V_{D,W_{op}}=I_{W\_1B}R_{3A}$ since $I_{W\_1A}=-I_{W\_2B}$ and $I_W=I_{W\_2B}.$ The speed of the low voltage swing at node D or X is related to the speed of the feedback loops including the resistance $R_{1A}$ or $R_{1B}$ and the transistor 24A or 24B, respectively. The speed of the feedback loop is related to a first pole of the feedback loop. The first pole is:

$$\text{Pole} = g_{m1}R_2\left(\frac{r_\Pi}{r_\Pi + R_1}\right);$$

$$\text{Since } r_\Pi \ll R_1, \ \text{Pole} \cong \frac{g_{m1}}{C_\Pi}\frac{R_2}{R_1};$$

$$\text{Since } C_\Pi = g_{m1}\tau_f, \ \text{Pole} = \frac{1}{\tau_f}\frac{R_2}{R_1} \text{ and } \tau_{speed} = \tau_f\frac{R_1}{R_2}$$

Therefore, increasing $R_2$ or decreasing $R_1$ will increase the speed. However, the speed cannot be increased beyond $\tau_f$. Therefore, $R_1$ and $R_2$ should be selected to be approximately equal. The speed of the high voltage swing at node D or X is maximized when $R_2$ is minimized.

As can be appreciated by skilled artisans, the values of the resistances and the magnitude of the current sources can be varied without departing from the present invention. For example, the current sources $I_{W\_1A}=I_{W\_1B}$ can have a magnitude of $I_{W\_2A}/k=I_{W\_2B}/k$ and the resistances can be $R_{1A}=R_{1B}=k*R_{3A}=k*R_{3B}$, where k is a constant. In a preferred embodiment, bipolar transistors such as silicon germanium (SiGe) are employed. Other bipolar transistors, CMOS transistors and/or any other transistor technology may be used.

Figure 6:
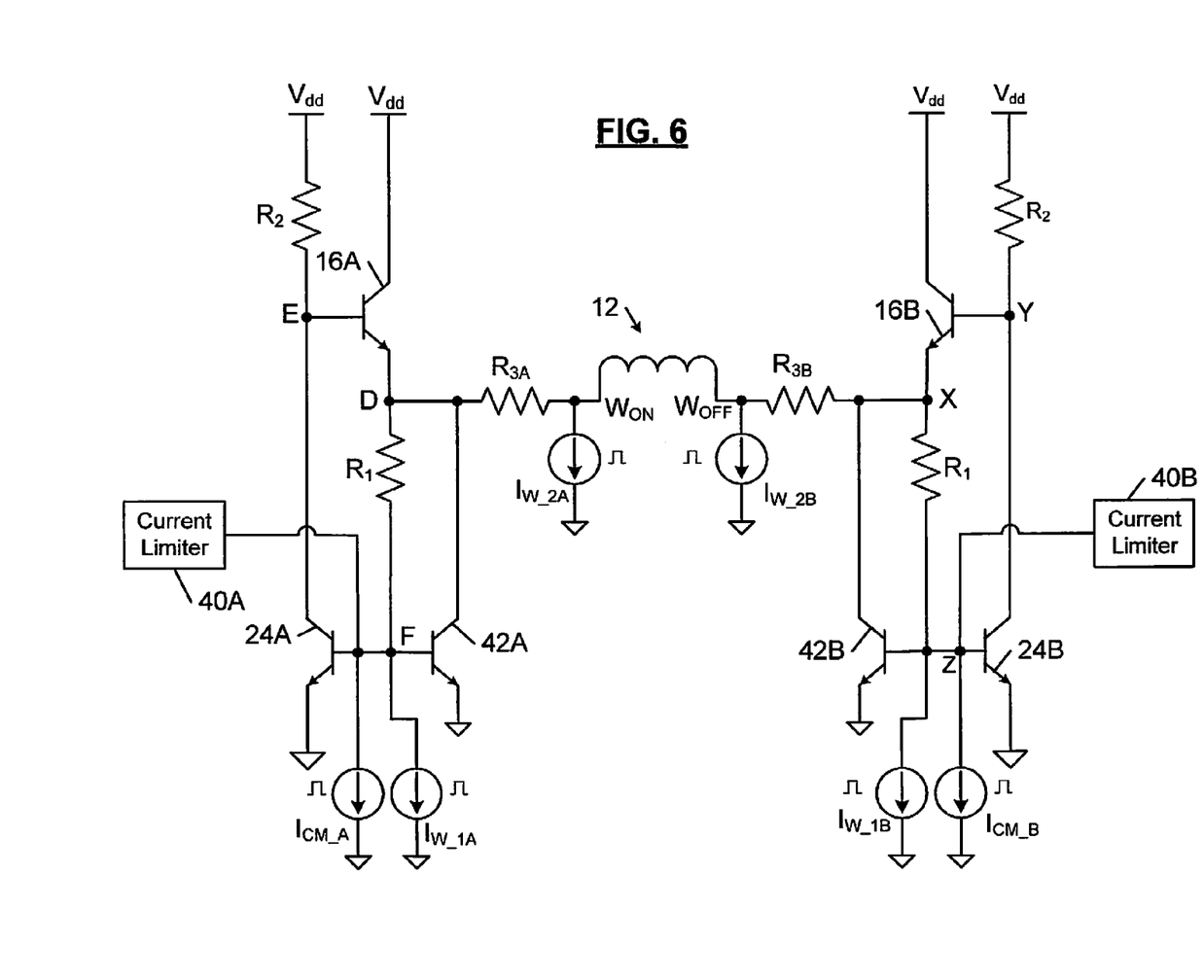
FIG. 6 is a schematic and functional block diagram of a write driver circuit including current limiters in accordance with the present invention.

Referring now to FIG. 6, the write driver sub-circuits 14A and 14B may optionally include current limiters 40A and 40B. A current step of $I_{CM}$ may cause transistors 24A and 42A to momentarily turn off. The current limiter 40A detects when the bases of transistors 24A and 42A are going off and immediately provides extra current to keep them on.

Figure 7:
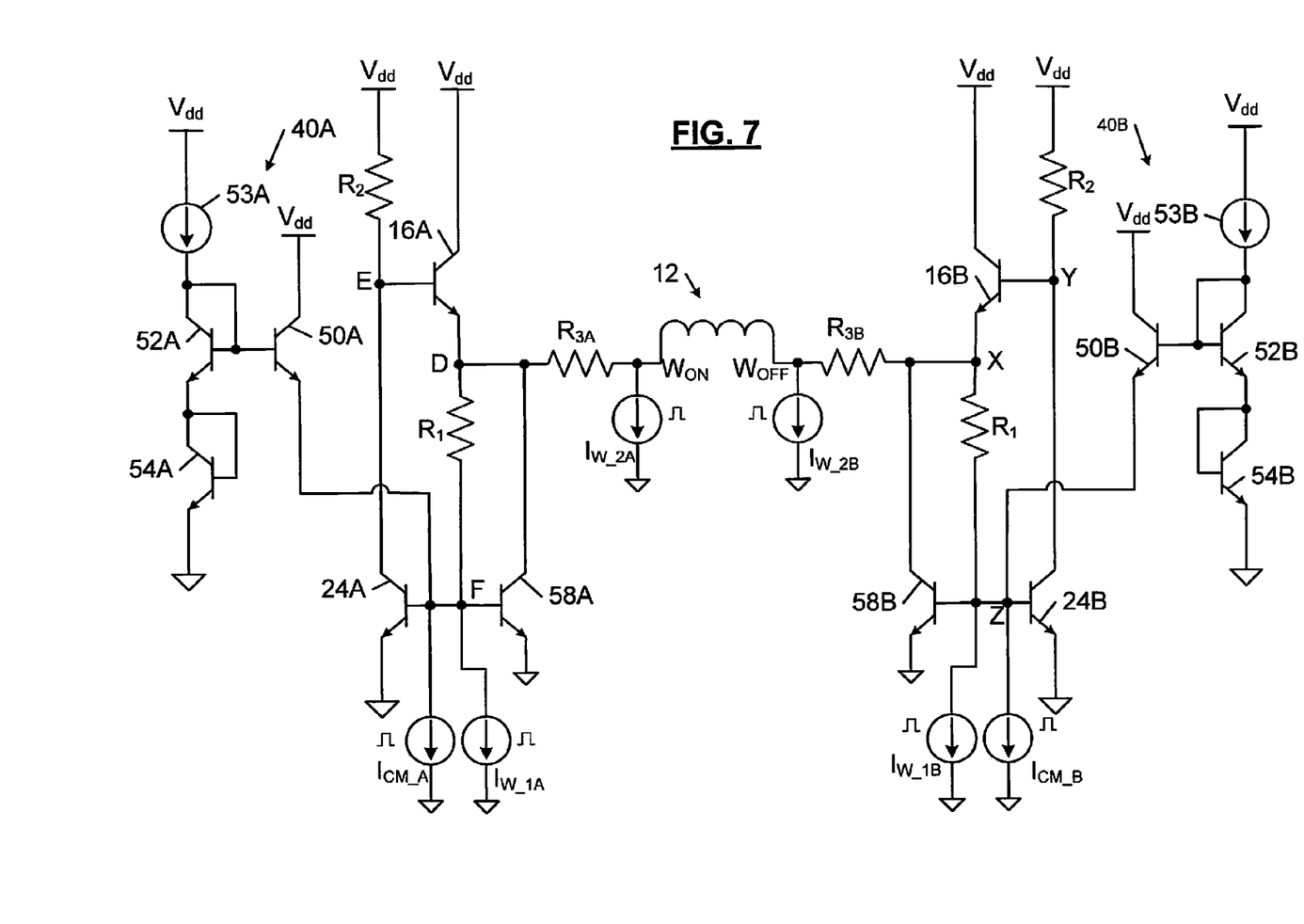
FIG. 7 is a schematic of a write driver circuit with exemplary current limiters in accordance with the present invention.

Referring now to FIG. 7, exemplary current limiters 40A and 40B are shown. A first transistor 50A includes an emitter that is connected to the bases of the transistors 24A and 42A. A collector of the transistor 50A is connected to $V_{dd}$. A base of the transistor 50A is connected to a base of a transistor 52A. A collector of the transistor 50A is connected to the base of the transistor 52A and to a current source 53A. An emitter of the transistor 52A is connected to a collector and a base of a transistor 54A. An emitter of the transistor 54A is connected to ground or another reference potential. While a specific current limiter 40 is shown, other types of current limiters may be used. A transistor 58A has a base that is connected to node F. An emitter of the transistor 58A is connected to ground or another reference potential. A collector of the transistor 58A is connected to node D. The transistor 58A reduces the impedance seen by the write head node $W_{ON}$.

Figure 8:
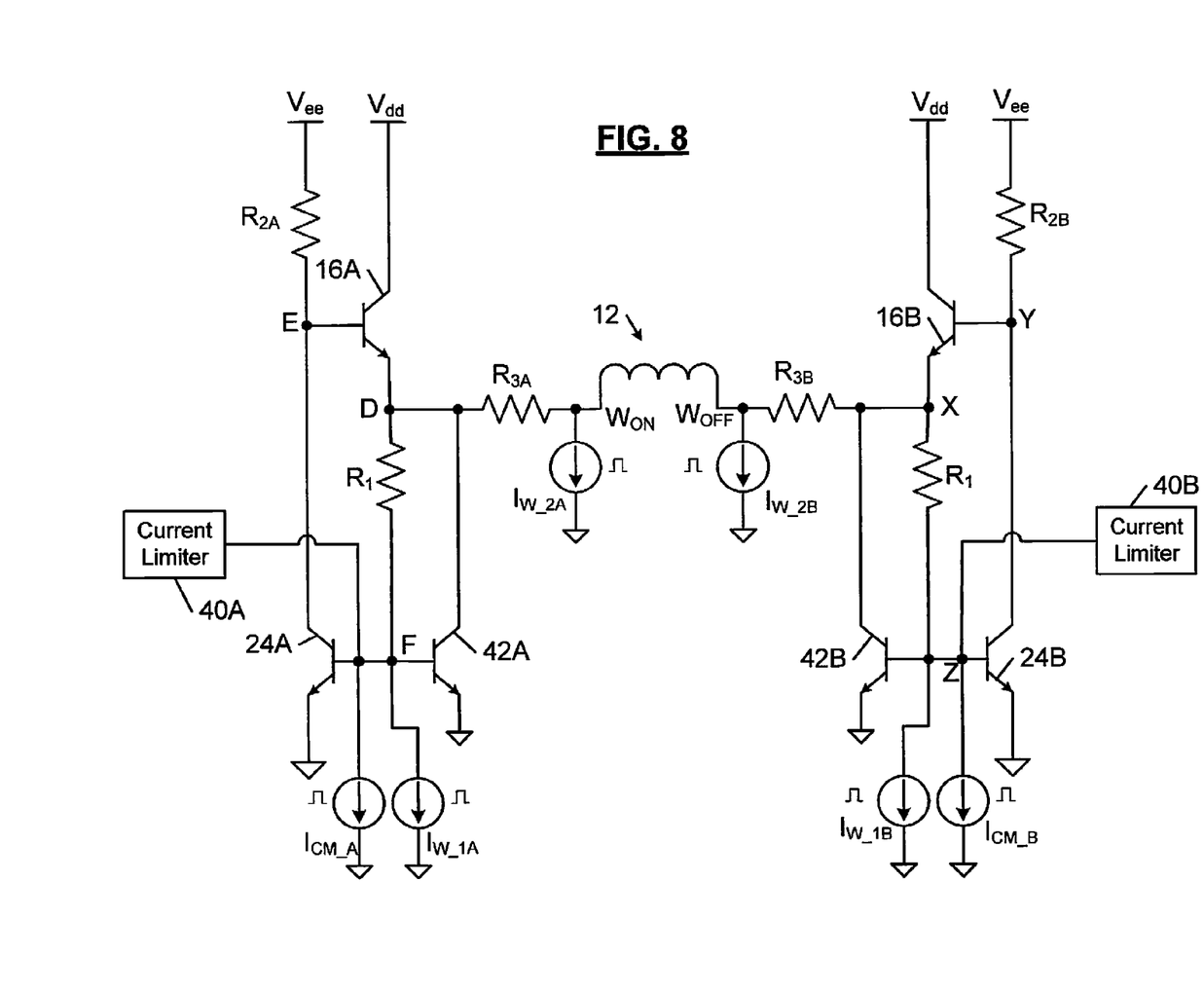
FIG. 8 is a schematic illustrating a write drive circuit having a two level voltage supply.

In some situations, as the voltage at node D goes high, the current that is supplied by the resistor $R_2$ and $V_{dd}$ may be insufficient. The transistor 16A and/or the transistor 24A may be starved for current, which reduces switching times of the write head. Referring now to FIG. 8, a schematic illustrating a write drive circuit having two voltage supply levels is shown. The resistor $R_2$ is supplied by $V_{ee}$ and the collector of the transistor 16A is supplied by $V_{dd}$, where $V_{ee}>V_{dd}$. For example, $V_{ee}$ can be approximately 10V and $V_{dd}$ can be 5V, although other voltage levels are contemplated. The higher voltage potential source $V_{ee}$ provides additional current through the resistor $R_2$ to supply transistors 16A and 24A.

Figure 9:
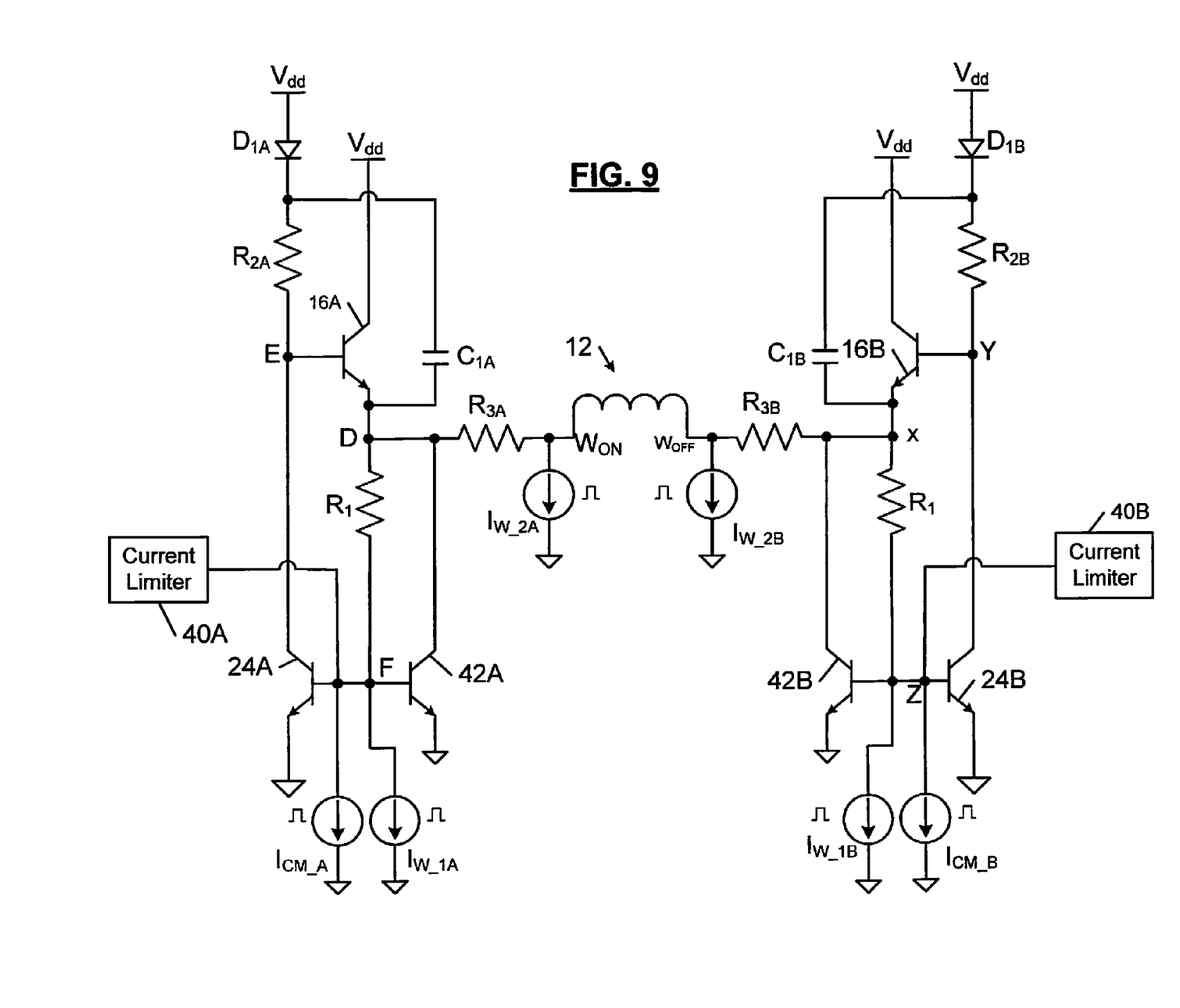
FIG. 9 is a schematic illustrating a writer driver circuit with a first charge pump circuit including a capacitor and a diode.

Referring now to FIG. 9, a writer driver circuit with a first charge pump circuit including a capacitor $C_{1A}$ and a diode $D_{1A}$ is shown. The diode $D_{1A}$ has an anode that is connected to a voltage source $V_{dd}$. A cathode of the diode $D_{1A}$ is connected to one end of the resistor $R_{2A}$ and to one end of a capacitor $C_m$. An opposite end of the resistor $R_{2A}$ is connected to the base of the transistor 16A. An opposite end of the capacitor $C_{1A}$ is connected to node D.

When node D is low (current flowing from node X to node D), a voltage difference across the capacitor $C_{1A}$ charges the capacitor $C_{1A}$. As node D goes from low to high during a transition from current flowing from node X to D to current flowing from node D to node X, the capacitor $C_{1A}$ discharges and provides additional current to the base of the transistor 16A and indirectly to transistor 24A. As a result, the transistors are supplied current during the transition, which increases the speed of the write head transition.

The additional current is provided only during the transitions from low to high. When node D is high, the capacitor $C_{1A}$ is not charged since there is no voltage difference across the capacitor $C_{1A}$. Therefore, when node D goes from high to low during a transition from current flowing from node D to X to current flowing from node X to node D, the capacitor $C_{1A}$ has nothing to discharge. As a result, current is only provided when needed and power consumption is reduced.

Figure 10:
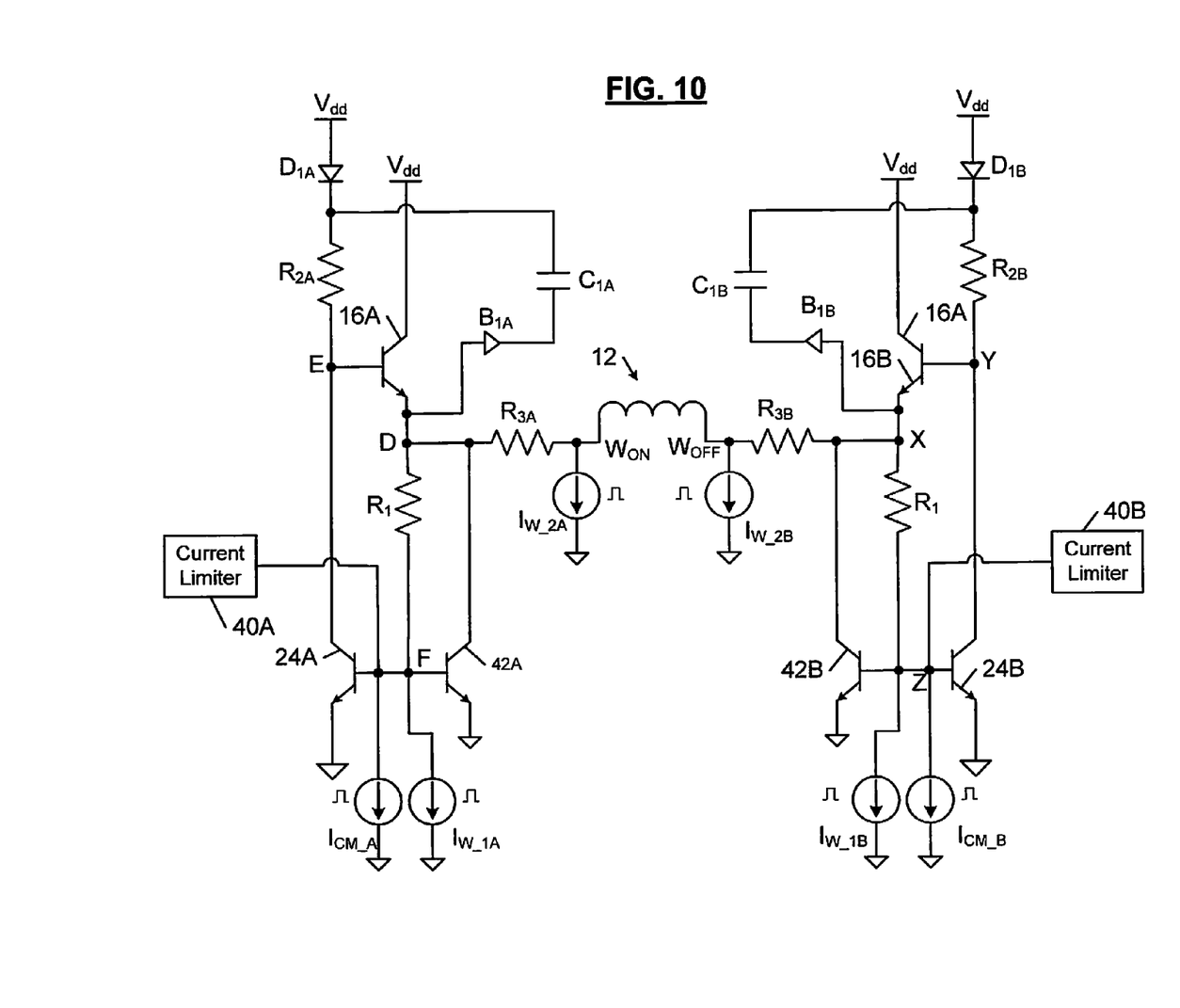
FIG. 10 is a schematic illustrating a write driver circuit with a third charge pump circuit including a capacitor, a diode and an isolation buffer.

Referring now to FIG. 10, a write driver circuit with a second charge pump circuit including the capacitor $C_{1A}$, the diode $D_{1A}$ and an isolation buffer $B_{1A}$ is shown. The diode $D_{1A}$, has an anode that is connected to a voltage source $V_{dd}$. A cathode of the diode $D_{1A}$ is connected to the resistor $R_{2A}$ and to one end of a capacitor $C_{1A}$. The isolation buffer $B_{1A}$ is connected to node D and to another end of the capacitor $C_{1A}$. The isolation buffer $B_{1A}$ reduces loading on the transistor 16A that would otherwise be caused by the capacitor $C_{1A}$. Otherwise, the second charge pump circuit provides additional current during the low to high transition at node D in a manner that is similar to the first charge pump circuit.

Figure 11:
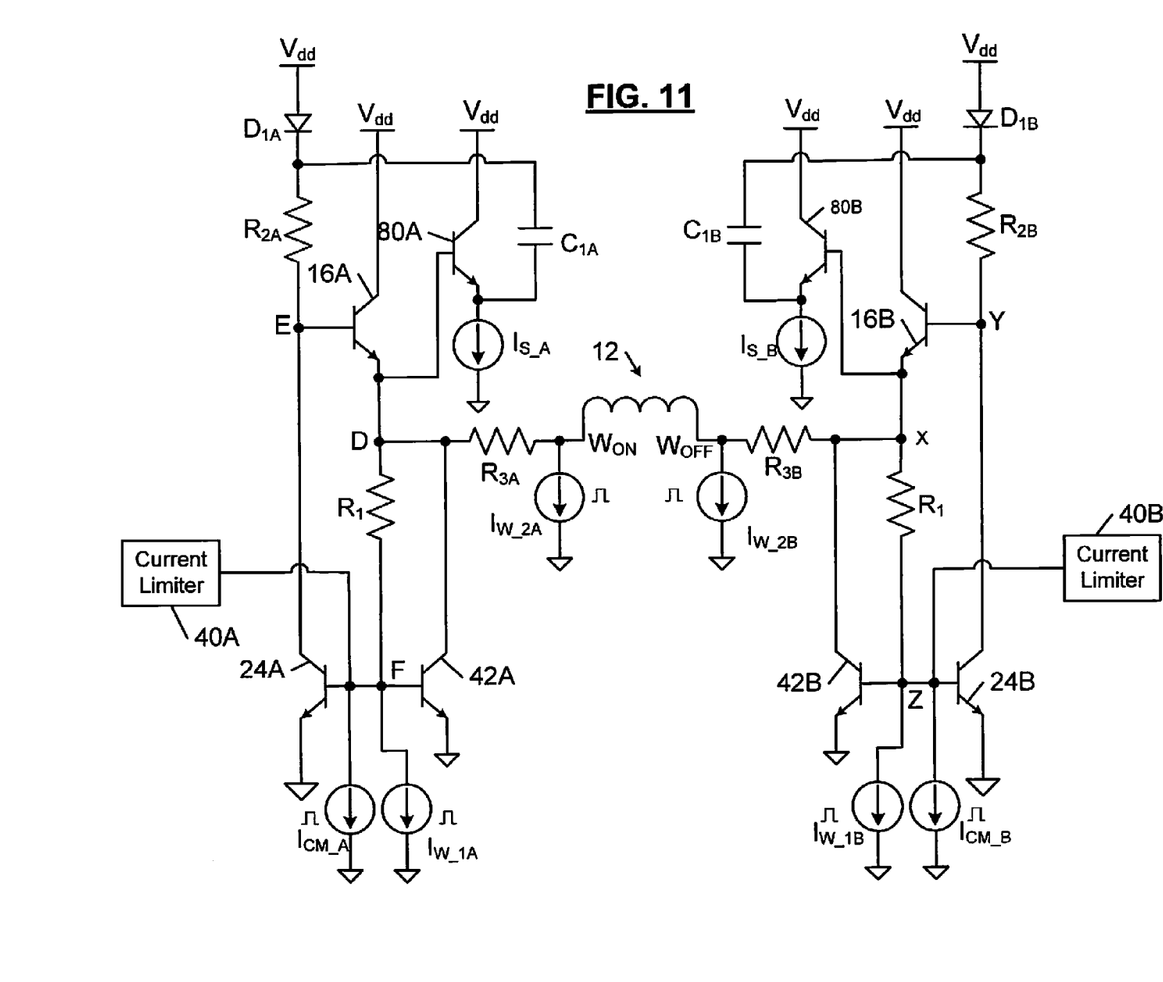
FIG. 11 is a schematic illustrating a write driver circuit with a second charge pump circuit including a capacitor, a diode and a replica transistor.

Referring now to FIG. 11, a schematic illustrating a write driver circuit with a third charge pump circuit including the capacitor $C_{1A}$, the diode $D_{1A}$ and a replica transistor 80A is shown. The diode $D_{1A}$ has an anode that is connected to a voltage source $V_{dd}$. A cathode of the diode $D_{1A}$ is connected to the resistor $R_{2A}$ and to one end of a capacitor $C_{1A}$. The replica transistor 80A has a base that is connected to node D, a collector that is connected to $V_{dd}$, and an emitter that is connected to an opposite end of the capacitor $C_{1A}$. A current source $I_{S\_A}$ is also connected to the emitter of the transistor 80A. The replica transistor 80A reduces loading on the transistor 16A that would otherwise be caused by the capacitor $C_{1A}$. Otherwise, the third charge pump circuit provides additional current during the low to high transition at node D in a manner that is similar to the first charge pump circuit.

Figure 12:
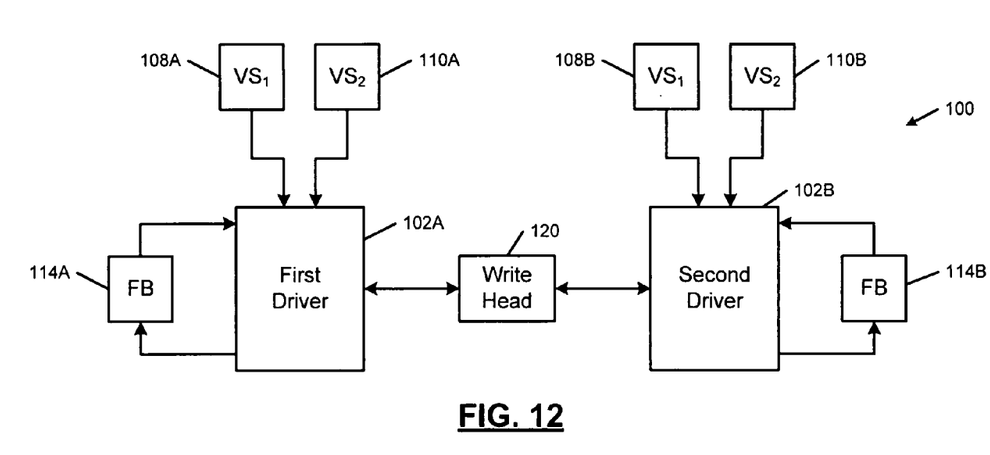
FIG. 12 illustrates a write driver circuit including first and second voltage supplies that supply first and second voltage levels.

Referring now to FIG. 12, a write driver circuit 100 includes first and second driver circuits 102A and 102B, which are connected to first and second voltage supplies 108A and 110A and 108B and 110B, respectively. The first voltage supplies 108A and 108B provide a higher voltage potential than the second voltage supplies 110A and 1108.

The first and second driver circuits 102A and 102B include feedback circuits 114A and 114B, respectively, that are connected between inputs and outputs of the first and second driver circuit 102A and 102B, respectively. The first and second driver circuits 102A and 102B drive current through a write head 120 in first and second directions to write data to the magnetic storage medium. The higher voltage potentials of the first voltage supplies 108A and 108B are used to increase current that is supplied to the first and second driver circuits 102A and 102B, respectively. The additional current provided during write head transitions increases the speed of the write head transitions.

Figure 13:
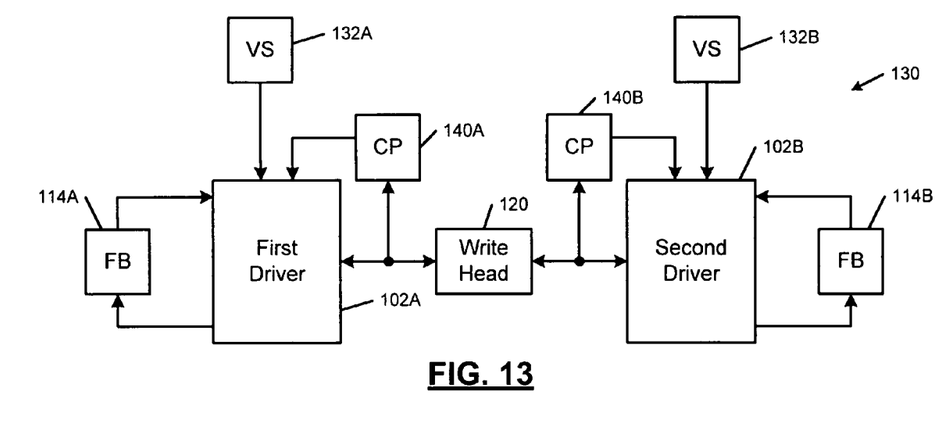
FIG. 13 illustrates a write driver circuit including first and second driver circuits with feedback and charge pumps connected to outputs of said first and second drivers.

Referring now to FIG. 13, a write driver circuit 130 includes first and second driver circuits 102A and 102B, respectively. Voltage sources 132A and 132B provide a first voltage potential to the first and second driver circuits 102A and 102B. Charge pump circuits 140A and 140B are connected to outputs of the first and second driver circuits 102A and 102B, respectively. The first and second driver circuits 102A and 102B include feedback circuits 114A and 114B, respectively, that are connected between inputs and outputs of the first and second driver circuit 102A and 102B, respectively. The charge pump circuits 140A and 140B provide additional current to the first and second driver circuits 102A and 102B, respectively. The additional current provided during the write head transitions increases the speed of the write head transitions.

Figure 14:
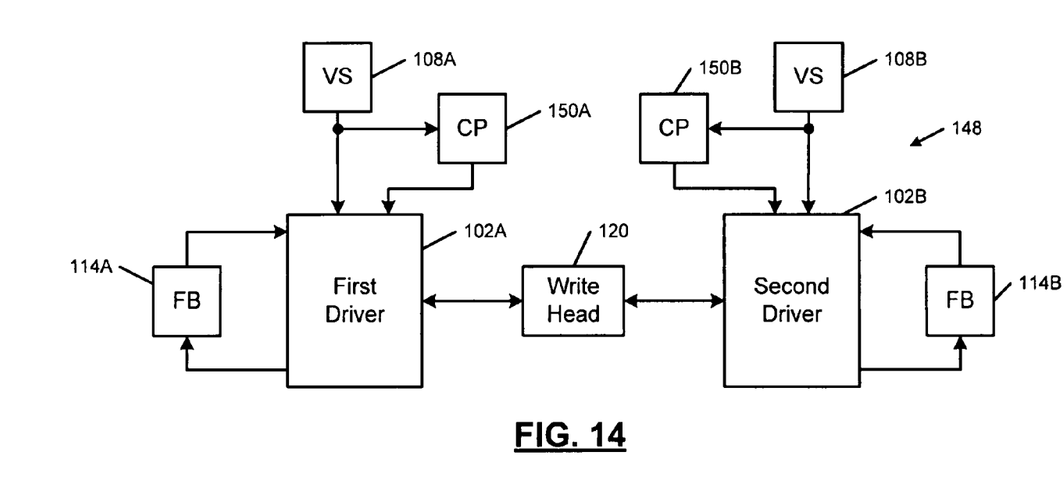
FIG. 14 illustrates a write driver circuit including first and second driver circuits with feedback and charge pumps.

Referring now to FIG. 14, a write driver circuit 148 is shown that is similar to the write driver circuit 130 in FIG. 13 except that charge pump circuits 150A and 150B are connected between the voltage sources 132A and 132B, respectively, (or any other suitable voltage source) and the first and second driver circuits 102A and 102B, respectively. The charge pump circuits 150A and 1508 provide additional current to the first and second driver circuits.

Figure 15:
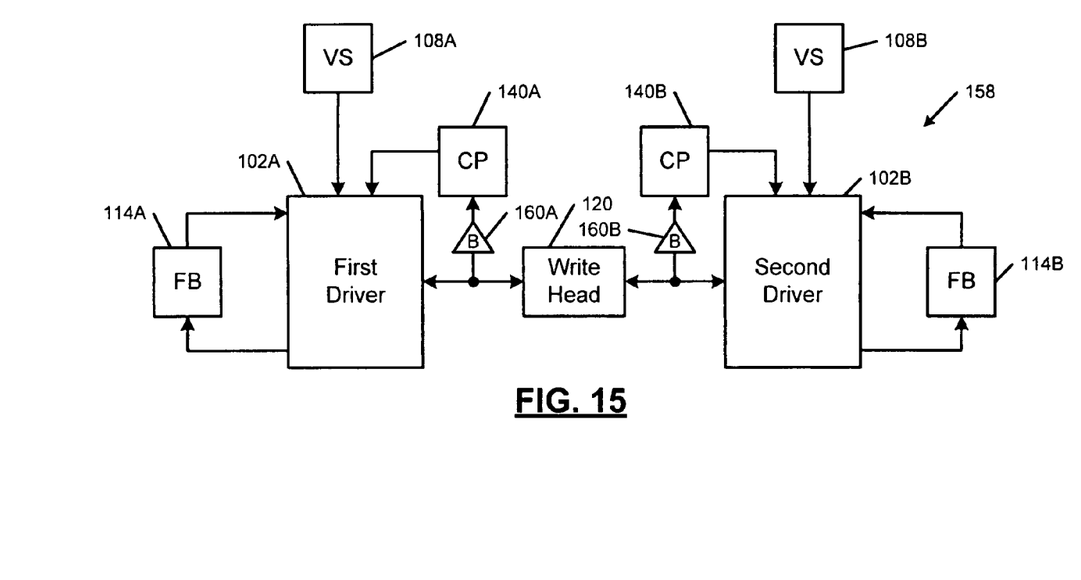
FIG. 15 illustrates a write driver circuit including first and second driver circuits with feedback and charge pumps that are connected by buffers to outputs of said first and second drivers.

Referring now to FIG. 15, a write driver circuit 158 is shown that is similar to the write driver circuit 130 in FIG. 13 except that buffers 160A and 160B are located between outputs of the first and second driver circuits, respectively, and inputs of the charge pumps 160A and 160B. The buffers 160A and 160B isolate the outputs of the first and second driver circuits 102A and 102B, respectively.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:
1. A write driver circuit, comprising:
a first write driver to communicate with a first node of a write head;
a first feedback path to communicate with a control input and an output of the first write driver, wherein the first feedback path includes a first resistance connected between the output of the first write driver and the control input of the first write driver;
a second write driver to communicate with a second node of the write head;
a second feedback path to communicate with a control input and an output of the second write driver, wherein the second feedback path includes a second resistance connected between the output of the second write driver and the control input of the second write driver;
a third resistance connected between the output of the first write driver and the first node of the write head; and
a fourth resistance connected between the output of the second write driver and the second node of the write head.

2. The write driver circuit of claim 1, wherein:
the first feedback path includes a first transistor to communicate with a first end of the first resistance and a second transistor to communicate with a second end of the first resistance; and
the second feedback path includes a third transistor to communicate with a first end of the second resistance and a fourth transistor to communicate with a second end of the second resistance.

3. The write driver circuit of claim 1, further comprising:
a first write current source connected between the output of the first write driver and the first node; and
a second write current source connected between the output of the second write driver and the second node, wherein the first write current source and the second write current source selectively drive current through the write head in a first direction.

4. The write driver circuit of claim 3, further comprising:
a third write current source connected to the first resistance; and
a fourth write current source connected to the second resistance, wherein the third write current source and the fourth write current source selectively drive current through the write head in a second direction.

5. The write driver circuit of claim 4, further comprising:
a first boost circuit configured to decrease a first transition period between current flowing in the first direction and current flowing in the second direction; and
a second boost circuit configured to decrease a second transition period between current flowing in the second direction and current flowing in the first direction.

6. The write driver circuit of claim 5, further comprising:
a first common mode (CM) current source connected to the first resistance; and
a second common mode (CM) current source connected to the second resistance.

7. The write driver circuit of claim 6, further comprising:
a first switch connected to the first resistance; and a second switch connected to the second resistance, wherein the first switch and the second switch are selectively turned on and off during a boost period of the write driver circuit.

8. The write driver circuit of claim 1, further comprising a charge pump circuit to provide current to the write driver circuit during a transition period between current flowing through the write head in a first direction and current flowing through the write head in a second direction.

9. The write driver circuit of claim 1, wherein the write driver circuit has a constant output impedance.

10. The write driver circuit of claim 1, wherein the write driver circuit includes a balanced differential and common mode resistance.

11. The write driver circuit of claim 1, wherein the write driver circuit maintains a constant common mode voltage across the write head.

12. A method of operating a write driver circuit, the method comprising:
   driving a first node of a write head with a first write driver;
   providing a first feedback path to communicate with a control input and an output of the first write driver, wherein the first feedback path includes a first resistance connected between the output of the first write driver and the control input of the first write driver;
   driving a second node of the write head with a second write driver;
   providing a second feedback path to communicate with a control input and an output of the second write driver, wherein the second feedback path includes a second resistance connected between the output of the second write driver and the control input of the second write driver;
   connecting a third resistance between the output of the first write driver and the first node of the write head; and
   connecting a fourth resistance between the output of the second write driver and the second node of the write head.

13. The method of claim 12, wherein:
   the first feedback patch path includes a first transistor to communicate with a first end of the first resistance and a second transistor to communicate with a second end of the first resistance; and
   the second feedback path includes a third transistor to communicate with a first end of the second resistance and a fourth transistor to communicate with a second end of the second resistance.

14. The method of claim 12, further comprising:
   connecting a first write current source between the output of the first write driver and the first node;
   connecting a second write current source between the output of the second write driver and the second node; and
   selectively driving current through the write head in a first direction with the first write current source and the second write current source.

15. The method of claim 14, further comprising:
   connecting a third write current source to the first resistance;
   connecting a fourth write current source to the second resistance; and
   selectively driving current through the write head in a second direction with the third write current source and the fourth write current source.

16. The method of claim 15, further comprising:
   decreasing a first transition period between current flowing in the first direction and current flowing in the second direction; and
   decreasing a second transition period between current flowing in the second direction and current flowing in the first direction.

17. The method of claim 16, further comprising:
   connecting a first common mode (CM) current source to the first resistance; and
   connecting a second common mode (CM) current source to the second resistance.

18. The method of claim 17, further comprising:
   connecting a first switch to the first resistance;
   connecting a second switch to the second resistance; and
   selectively turning on and off the first switch and the second switch during a boost period of the write driver circuit.

19. The method of claim 12, further comprising providing current to the write driver circuit during a transition period between current flowing through the write head in a first direction and current flowing through the write head in a second direction.

20. The method of claim 12, further comprising maintaining a constant common mode voltage across the write head.

* * * * *